Patented Sept. 17, 1946

2,407,801

UNITED STATES PATENT OFFICE 2,407,801

METHOD OF PREPARING FRUIT FOR MARMALADES, ETC.

Otto J. Steinwand, Redwood City, Calif.

No Drawing. Application June 12, 1943, Serial No. 490,675

5 Claims. (Cl. 99—102)

This invention relates to the processing of raw fruits, etc., and more particularly to a process embodying methods, principles and improvements that are new in the art of making marmalades, jams, preserves, glacé fruits or candied peels from such fruits to which the process is applicable, especially the citrus fruits; oranges, lemons, grapefruit, citrons, tangerines, etc.

An object of the invention is to provide an improved process for treating fruits and the like in preparation for the manufacture of marmalades, jams, preserves, etc., which can be carried out in a simple, economical and practical manner.

Another object of the invention is to provide a process for treating oranges, lemons, grapefruit and other citrus fruit in preparation for the manufacture of marmalades, jams, preserves, etc. by which the excess oil and bitterness of the peel are removed and the protopectin in the pulp of the peel is converted to pectin in the presence of the sugar and other juices of the fruit in an economical and efficient manner.

Another object of the invention is to provide a process for preparing citrus fruits for the manufacture of marmalades, jams, preserves, etc. by which the protopectin present in the peel and/or outer pulp of the fruit is converted to pectin without exposing the inner protopectin-free cells of the fruit to the action of the treating solution.

Other objects and advantages of the invention will be in part evident to those skilled in the art and in part pointed out hereinafter as the description thereof proceeds.

Since oranges are more extensively used in the making of marmalades, etc. than are the other citrus fruits above mentioned, the invention will be described hereafter in connection with the making of orange marmalade. It will be understood, however, that the process may be carried out in treating other fruits to which it is applicable with such variations of time, temperature, strength of solution, and other details as the differences in kind, size and quality of the fruits make necessary.

Heretofore, in the making of orange marmalade, it has been the practice to cut off from the fresh orange a considerable portion of the peel and treat this peel separately from the remaining part of the orange. This is the peel which appears suspended in the finished marmalade. Under this prior practice, the sliced peel alone is cooked in water and drained several times to make it tender and to free it from orange oil and bitter taste, and the water from the cookings is discarded. Then the oranges, with or without the remainder of the peel, are shredded or cut up, cooked with water and drained or pressed to collect the pectin, fruit sugar and juices, and the pressed pulp is discarded. The collected pectin, fruit sugar and juice is then cooked with the required additional amounts of sugar and the previously prepared sliced peel to complete the marmalade. In this prior process the removing of the peel from the fruit, slicing it and then cooking in several waters, results in the loss of considerable of the pectin naturally present which is dissolved out and discarded with the cooking water. This treatment also leaves the inner white part of the peel less plump and smooth and the outer skin of the peel hard, fibrous, and woody, due to the presence of unconverted protopectin.

As distinguished from the above process, the present invention contemplates the treatment of the peel and pulp of the fruit while whole in a single continuous operation and does not involve any material loss of the pectin, sugar or juices of the fruit. In carrying out the invention the whole oranges are first abraded over their entire surface to remove just enough of the outer waxy layer or skin of the peel to make it permeable to the solution used in the processing of the fruit. This abrading also opens the oil cells of the peel and permits the escape of the oil which is in excess of the amount required for flavor and thus the bitter taste, which is naturally present in the peel of the fruit, will be removed at this step in the process. This abrasion of the outer skin of the fruit can be done by the use of various devices, such as the machines commonly used for peeling vegetables. The same result may also be obtained by submerging the oranges for from one to three minutes in a boiling salt solution of approximately 10% to 15% concentration and then rinsing with fresh water.

After this initial treatment, the whole oranges are submerged in a water solution of any organic or mineral acid which may be lawfully used in the preparation of food. Among some of the organic acids which may be used are citric acid, tartaric acid, malic acid and lactic acid; and as for the mineral acids, it is conceivable that hydrochloric acid, as well as phosphoric acid might be used, the latter acid being preferred, as it will leave no foreign odor or taste in the finished product. For citrus fruits, citric acid is preferred because this acid is naturally present in this type of fruit. The acidity of the solution should be from one-tenth per cent to two per cent, depending upon the temperature of the solution, the time of submersion, and the nature of the fruit from which the product is to be made. For orange marmalade a strength of one-half per cent acid, at a temperature of 180° F. to 200° F. for one to two hours is satisfactory.

When no cooking of the fruit is required, as would be the case in the making of glacé or candied peel from the peel of the fruit and the juice from the pulp, a lower temperature and longer time of submersion are used. At a temperature of 150° F. to 160° F. the time required for processing the peel will be about three or four hours and the fruit will remain firm in texture and fresh in appearance. When the process is carried out at room temperature, the processing will take from twenty to seventy-two hours, depending upon the condition of the fruit and the product to be made.

The function of the acid solution in this treatment is mainly to convert hard insoluble protopectin of the fruit to pectin. This protopectin, which is naturally present in the peel, is objectionable, as it tends to make the peel tough and hard, particularly its outer portion. When this hard and insoluble protopectin is subjected to the action of the acid solution by the above treatment, it will be converted into a soft, soluble and jelly-like pectin and, as a result, the peel will have a smooth, slippery, non-porous and translucent quality not possessed by a peel which has been processed in water only. Also by processing the fruit whole in the manner proposed, a minimum of soft fruit pulp will be exposed to the acid solution and, at the same time, since the fibres near the outer surface of the peel are denser than the fibres of the inner part of the peel, there will be very little loss of the natural pectin and converted protopectin into the processing acid solution.

A further advantage in processing the fruit whole with the peel practically unbroken is that the protopectin and the harder part of the peel which lies just under the outer surface of the peel, will be exposed directly and for a longer period of time to the full heat and acid strength of the processing solution. Furthermore, the sugar and other solutes naturally present in the fruit juice will not be released and free to act as a buffer, which would retard and hinder the conversion of protopectin into pectin. Contrariwise, if the fruit were cut up prior to treatment, the juice of the fruit would mix with and dilute the processing solution, and in addition the naturally softer inside parts of the fruit would be overdone and become too tender before the harder peel has been completely processed. By cooking the orange or other fruit whole and with the peel uncut, the interior of the fruit will be protected from the air and, as a result, oxidation, evaporation and loss of flavor will be avoided during the processing and cooking operations, and the acid treating solution will also remain substantially free from dilution by the escape of juice and sugar from the fruit. Therefore, the treating solution may be used over and over on a number of successive batches of fruit.

After the peel of the oranges is sufficiently processed and the interior pulp sufficiently precooked, as indicated by its tenderness and appearance, and as determined by experience, the oranges are removed from the acid treating solution and rinsed with water. As a final step the oranges can now be cut and sliced or shredded, as required for the product to be made. For marmalade it is preferable to cut the oranges into quarters, sixths, or eighths and then slice these sections crosswise to the desired thinness. To the fruit thus cut is added the required amount of additional syrup or sugar and pectin to complete the batch and the mixture is then heated or cooked for a period of time necessary to finish the marmalade.

While I have, for the sake of clearness and in order to disclose the invention so that the same can be readily understood, described specific ingredients and proportions, I desire to have it understood that this invention is not limited in these respects, but may be embodied in other ways that will be apparent to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. The process for preparing citrus fruits for the making of marmalades, jams, preserves, which comprises abrading the peel of the fruit to open the oil cells, submerging the abraded fruit while whole in a weak acid solution to convert the protopectin of the peel to pectin, washing the fruit in clear water to remove the excess acid, cutting the thus treated fruit to desired size and thickness, and finally cooking the cut fruit with additional syrup, sugar and pectin as desired to complete the product.

2. The steps in the herein disclosed process for preparing citrus fruits for the making of marmalades, jams and preserves, which comprise an abrading of the outer skin of the fruit peel to permit penetration of a treating solution, subjecting the fruit in said condition and while whole to the action of a weak acid solution at a temperature and for a time sufficient to convert the protopectin in the peel to pectin, washing the fruit thus treated, and finally cutting the fruit with the peel attached and cooking to complete the product.

3. The method of making marmalades, jams and preserves, from citrus fruits, which comprises abrading the outer skin of the peel of the fruit while whole, soaking the thus abraded whole fruit in a one-half per cent citric acid solution at a temperature ranging from 180° F. to 200° F. for a period of one to two hours, washing the fruit to remove excess acid, cutting the thus treated whole fruit to the desired size and thickness, and finally cooking the cut fruit and peel to complete the product.

4. In a process for preparing marmalades, jams and preserves from citrus fruits which comprises a cutting and cooking of the fruit to complete the product, the novel steps of first mechanically abrading the peel of the fruit to open the oil cells thereof, soaking the abraded fruit while whole in a $\frac{1}{10}$% to 2% acid solution at a temperature ranging from 180° F. to 200° F. for a period of from one to four hours, washing the fruit in clear water to remove any excess acid, cutting the thus treated fruit to the desired size and thickness, and finally cooking the cut fruit to complete the product.

5. In a process for preparing marmalades, jams and preserves from citrus fruits which comprises a cutting and cooking of the fruit to complete the product, the novel steps of first abrading the peel of the fruit while whole to remove its outer waxy layer, subjecting the thus abraded whole fruit to the action of a weak acid solution having an acidity ranging between $\frac{1}{10}$ of 1% to 2%, and washing the thus treated fruit prior to the cutting and cooking thereof to complete the product.

OTTO J. STEINWAND.